US007614039B2

(12) United States Patent
Jolley

(10) Patent No.: US 7,614,039 B2
(45) Date of Patent: Nov. 3, 2009

(54) BACKING FILES FOR PORTAL ELEMENT CONTROLS

(75) Inventor: Chris Jolley, Broomfield, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 821 days.

(21) Appl. No.: 11/131,578

(22) Filed: May 18, 2005

(65) Prior Publication Data

US 2006/0069920 A1 Mar. 30, 2006

Related U.S. Application Data

(60) Provisional application No. 60/573,267, filed on May 21, 2004.

(51) Int. Cl.
*G06F 9/45* (2006.01)

(52) U.S. Cl. ...................................................... 717/114

(58) Field of Classification Search .................. 717/114
See application file for complete search history.

(56) References Cited

U.S. PATENT DOCUMENTS

| | | | |
|---|---|---|---|
| 6,327,628 B1 | 12/2001 | Anuff et al. | |
| 2004/0010719 A1 | 1/2004 | Daenen | |
| 2004/0025060 A1 | 2/2004 | Raffaele et al. | |
| 2005/0108034 A1 * | 5/2005 | Musson et al. | 705/1 |
| 2005/0108699 A1 * | 5/2005 | Olander et al. | 717/166 |
| 2006/0206856 A1 * | 9/2006 | Breeden et al. | 717/101 |

* cited by examiner

*Primary Examiner*—John Chavis
(74) *Attorney, Agent, or Firm*—Fliesler Meyer LLP

(57) ABSTRACT

Backing files and backing contexts can be associated with portal elements controls for the construction of a portal. The backing files and backing contexts can allow interactions with the portal element controls before rendering. In one embodiment, developers are allowed to have access to backing files and backing contexts. The backing files allows developer code to be run before rendering. The backing contexts allow the setting and getting of information from the portal element controls.

20 Claims, 3 Drawing Sheets

BACKING FILES FOR PORTAL ELEMENT CONTROLS

CLAIM OF PRIORITY

This application claims priority to U.S. Provisional Application No. 60/573,267 entitled "Backing Files and Backing Context for Portal Element Controls", filed May 21, 2004, by Chris Jolley.

FIELD OF THE INVENTION

The present invention is directed to portal technology.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, the java archive (JAR) files that contain the logic and formatting instructions for the portal application; and any other files necessary for the desired portal application.

DETAILED DESCRIPTION

Portals can provide access to information networks and/or sets of services through the World Wide Web (WWW) or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by an integrated design environment or administration tool. Portlets can also be associated with portlet resource files including skeleton JSPs (one for each portlet layout element) and image files saved to a local file system by portal designer of integrated design environment.

Figure 1:
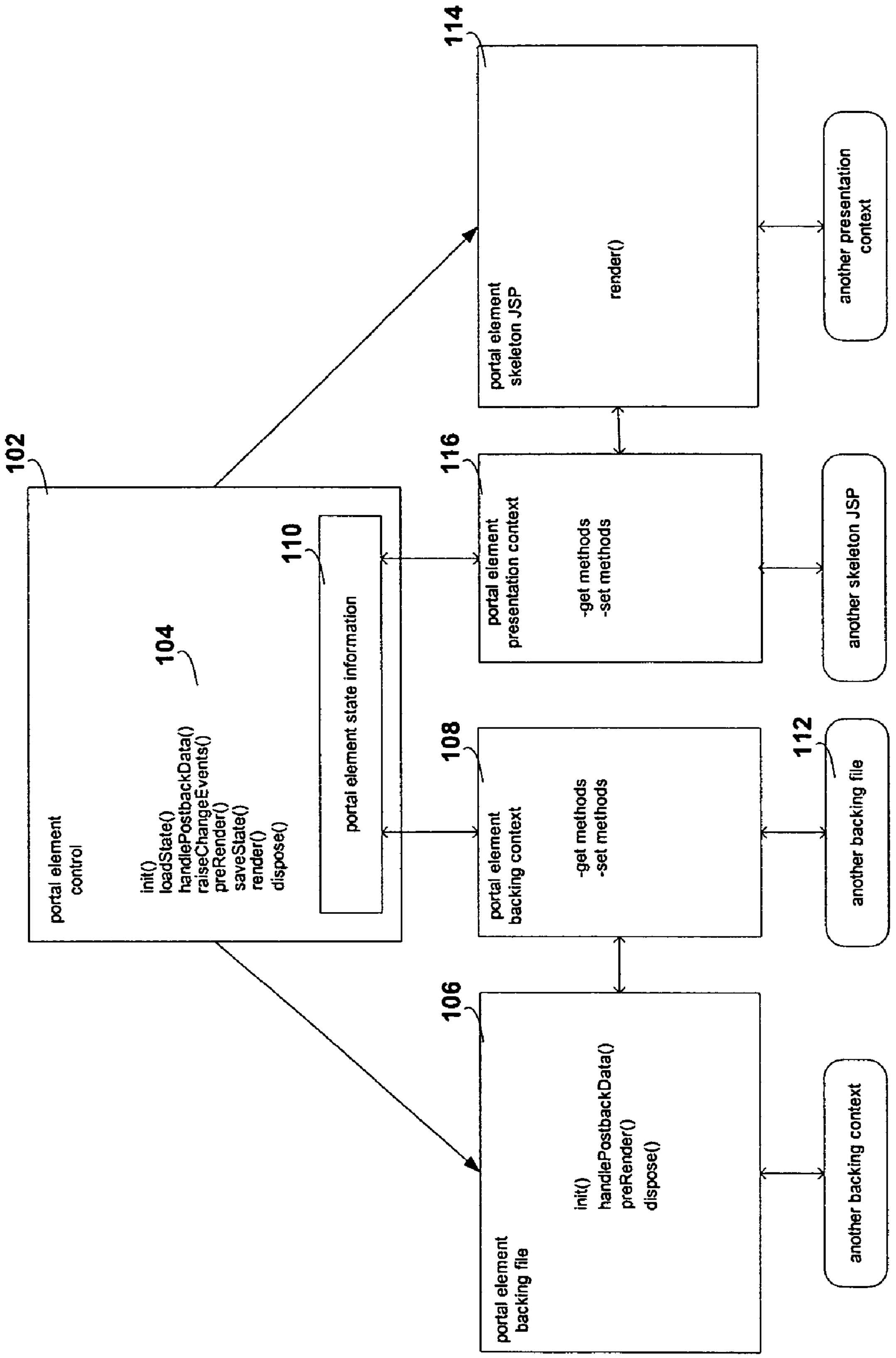
FIG. 1 is a diagram that illustrates a portal element control, backing file, and backing context.

FIG. 1 illustrates a portal element control 102. Portal elements can include the desktop, books, pages, portlets, menus, layouts and Java Server Page (JSP) content. The portal element controls and backing files can be for desktops, books, pages, portlets, JspContent or other portal elements. The portal element control can be a Java class that extends a main UIcontrol class. The portal element controls allow for the construction of the portals and the interactions of portal elements. The portal element control 102 can include lifecycle methods 104. The lifecycle methods 104 can be performed in a predetermined order. In one embodiment, a number of the methods are done before rendering the portal element. The lifecycle methods can include init( ), loadState( ), handlePostbackData( ), raiseChangeEvents( ), preRender( ), saveState( ), render( ) and dispose( ).

In one embodiment, the portal element controls are not directly exposed to developers. Backing files and backing context and other structures can be used to allow the developer to interact with a portal element control. The backing context and backing files can restrict the developers access to the portal file controls. This allows the portal element control code to be updated and improved without damaging developers' implementations as long as the interactions with the backing file and backing context are supported.

The backing file can include code provided by the developer. The portal element control 102 can use backing file code of the backing file 105 in at least one lifecycle method before the rendering of the portal element.

In one embodiment, the developer can write backing code for the backing file to allow the developer to run business logic, modify the portal element display, cause events, catch events and do other functions before doing the rendering. For example, the backing file can allow code to be run for the lifecycle methods init( ), handlePostbackData( ), and preRender( ) before the portal element is rendered and allow code to be run for dispose( ) after the portal element is rendered. A new instance of the backing file can be created for each request so that the backing files can be thread safe.

A backing context 108 can allow access to methods to affect state information 110 of the portal element control before the rendering of the portal element.

The backing context 108 can allow access to get methods to read portal element state information and allow access to set methods to write portal element state information. The methods of the backing context can hide some portal element control methods from the developers. The backing context 108 can be called by other backing files, such as backing file 112.

A portal element skeleton JSP 114 can be used by the portal element control 102 during the rendering of the portal element. The developer can write skeleton JSP code to affect the rendering of the portal element.

A presentation context 116 allows access to methods to affect state information of the portal element control during the rendering of the portal element. A portal element skeleton JSP can use the presentation context 116 to access the portal state information.

One method of the present invention uses a portal element control 102 along with a backing context 108 for the portal element control. The backing context 108 can allow access to methods 104 to affect state information 110 of the portal element control 102 before the rendering of the portal element.

Figure 2:
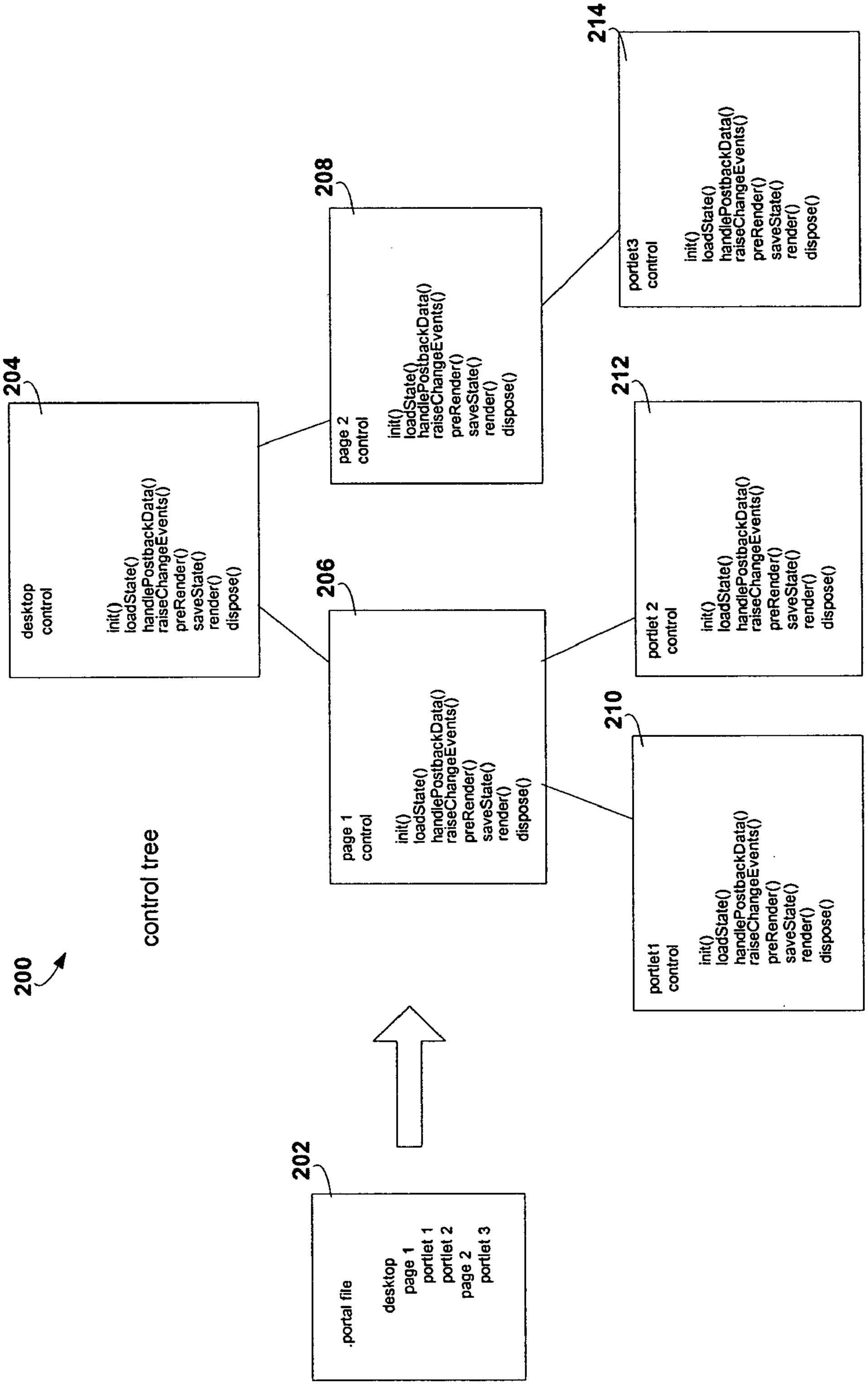
FIG. 2 illustrates the construction of a control tree of portal element controls produced from a portal file.

FIG. 2 shows the construction of a control tree 200 of portal element controls from a portal file 202. In one embodiment, the hierarchy of the portal elements defined in the portal file 202 is used to construct the control tree 200. In the example of FIG. 2, the desktop control 204 has children: page1 control 206 and page2 control 208; page1 control 206 has children: portlet1 control 210 and portlet2 control 212; and page2 control 208 has a child portlet3 control 214. A portal configuration stored in a database can also be used to construct a control tree including portal element controls.

The methods of the control tree can be called in order of the lifecycle methods. For example, all of the init( ) methods can be called by followed by all of the loadState( ) methods, and so on. In one embodiment, the methods are called in depth first order. For the example of FIG. 2, the init( ) for the desktop control 204 is called, followed by the init( ) for the page1 control 206, followed by the init( ) for the portlet1 control 210, followed by the init( ) for the portlet2 control 212 and the init( ) for the page2 control 208 followed by the init( ) for the portlet 3 control 214. The loadState( ) and other lifecycle methods are called in the same depth first order. In alternate embodiments, the lifecycle methods can be called in another order.

During certain of the lifecycle methods, the code in the backing files associated with each of the portal element controls can be run. These can also be run in a predetermined order, such as the depth-first order described above. For example, during the init( ) stage of portal element control, a backing file correspond to the page1 control 206 can be called. If there is code written by the developer in the backing file for the init( ) method, this code can be run. In one embodiment, the code can get information from another control or set information from another control using the backing context of the other portal element control. The backing file can also set and get events. For example, the backing file can set an event which later can be searched for by another backing file.

The ability to get and set information concerning the portal element controls using backing files allows the user to, for example, change the title of a portlet or change other display information, minimize a portlet or do a variety of actions before the rendering phase. The backing files provide an easy way to allow portal elements to affect rendering of other portal elements before the rendering phase.

Figure 3:
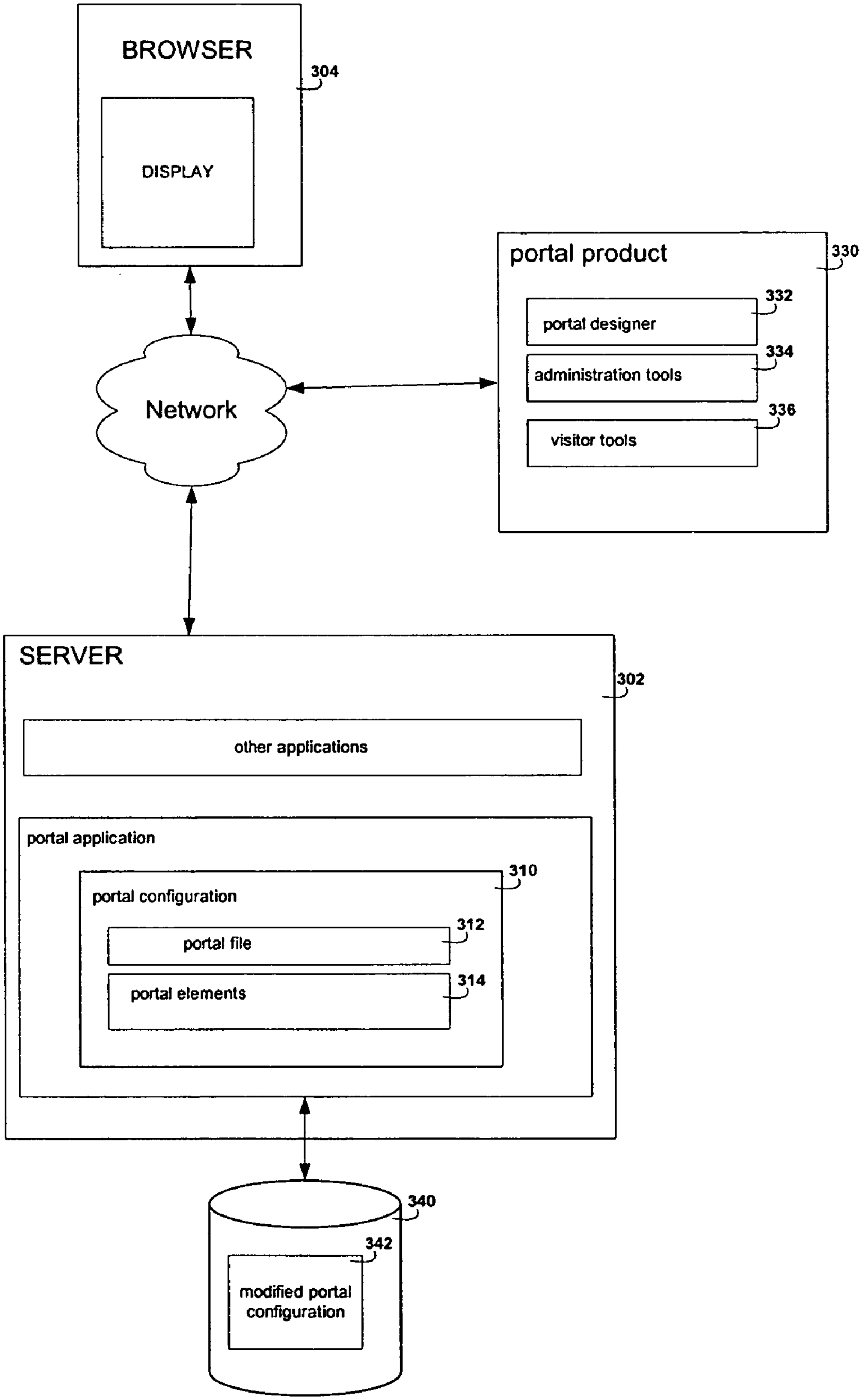
FIG. 3 illustrates a system of one embodiment of the present invention.

FIG. 3 illustrates a system for implementing one embodiment of the present invention. Server 302 can be used to produce the portal for display at the browser 304. In one embodiment, the server 302 produces a portal display in response to a request from the browser client 304. The portal can be configured for different users and different groups of users, where different portlets can be displayed based upon a user's group or role. The server 302 can use a portlet configuration 310. The portlet configuration can include a portal file 312 which can be an XML file indicating the portal elements. The server 302 can use portal file 312 to construct a control tree of the portal element controls. The portal element controls can execute to produce the portal.

The server 302 can be software that can be run on one or more server machines. In one embodiment, the server 302 is the WebLogic Server™ available BEA Systems Inc., of San Jose, Calif.

A portal product 330 can be an Integrated Designed Environment (IDE) for producing the portal. In one embodiment, the IDE includes a portal designer 332 for the design of the portal, portlets and other portal elements. The administration tools 334 and visitor tools 336 are used for producing versions of the portal. In one embodiment, different versions use the portal configuration 310 to produce a modified portal configuration 342 that can be stored in a database 340. Portals can be produced from the database 340, a cache or directly from the portal configuration 310.

Appendix I shows a non-limiting example of one embodiment. For example, the discussion of the implementation of the portal element controls, backing files and backing context described in the Appendix I are understood to concern one embodiment and are not meant or believed to have the effect of limiting the meaning of these terms. The Appendix I is provided to illustrate how these concepts can be implemented in one exemplary embodiment.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nanoscale systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

APPENDIX 1

Definition of Terms, Acronyms, and Abbreviations

Netui – Also called Page Flows, a programming model for building model 2 type applications. Netui is built on top of the popular Struts framework.

Netuix - An XML framework for rendering applications. Netuix was originally contrived as an extension to netui. However, today netuix is no longer based on netui nor dependant on it. They are completely different technologies. Only the names are similar. With that said, netuix can seamlessly host netui applications.

Customization – The term used to modify a portal through an API. This API is typically called from our WebLogic Administration Portal and Visitor Tools pages but is also available to developers who whish to modify the desktop. The API provides all the CRUD operations needed to modify a desktop and all of its components (Portlets, Books, Pages, Menus, and so on). Customization is different than Personalization. With Customization, someone is making a conscious decision to change the makeup of the desktop. With Personalization, changes are made based on rules and behavior (display an ad for Broncos tickets because it's Friday and the visitor lives in Denver).

Portal Framework – The portion of WebLogic PortalWeblogic Portal that is responsible for the rendering and *Customization* of the portal–what this document is all about.

Light Portal (File-based Portal) – A stripped down version of WebLogic Portal that does not deploy any EJBs or database. The light portal supports all the functionality in the portal framework with the exception of *Customization*. Light Portal can only render portal files, it cannot go to the database for a *Customized* desktop. Light portal rendering occurs in WebLogic Workshop in the development environment.

UIControl – A netuix user interface control, not to be confused with business controls in WebLogic Workshop. Each element in the XML document (.portal, .portal, .shell, .layout, .laf and .menu) represents an instance of a control. Typical controls are Books, Pages, Menus, Portlets, and so on.

Single File vs. Streamed Rendering - The `.portal` file you create in WebLogic Workshop is a fully functioning portal, however, it can also be used as a template to create a desktop. In this template you create books, pages and references to portlets and define defaults for them. When you view the `.portal` file with your browser the portal is rendered in "single file mode," meaning that you are viewing the portal from your file system as opposed to a database. The `.portal` file's XML is parsed and the rendered portal is returned to the browser. The creation and use of a `.portal` is intended for development purposes and for static portals (portals that are not customized by the end user or administrator). Because there is no database involved you cannot take advantage of things such as user customization or entitlements. Once you have created a `.portal` file you can use it to create desktops for a production environment.

A desktop is a particular view of a portal that visitors access. A portal can be made up of multiple desktops, making the portal a container for desktops. A desktop contains all the portlets, content, shells, layouts, and look and feel elements necessary to create individual user views of a portal. When you create a desktop based on the `.portal` file in the WebLogic Administration Portal, a desktop and it's books and pages are placed into the database. The desktop, books and pages reference shells, menus, look and feels and portlets. The settings in the `.portal` file, such as the look & feel, serve as defaults to the desktop. Once a new desktop is created from a `.portal` template, the desktop is decoupled from the template, and modifications to the `.portal` file do not affect the desktop, and vice versa. For example, when you change a desktop's look & feel in the WebLogic Administration Portal, the change is made only to the desktop, not to the original `.portal` file. When you view a desktop with a browser it is rendered in "streaming mode" (from the database). Now that a database is involved, desktop customizations can be saved and delegated administration and entitlements can be set on portal resources.

Library – The library is a home for a set of controls that are not associated with a desktop. In other words Books, Pages, Portlets, can be created and modified with out a desktop and then later added to a desktop. Changes to objects in the library are cascade down through the desktops and user customizations.

Netuix

Controls

As stated earlier, netuix is an XML framework for rendering applications, whether these applications look like portals or not. Many customers who use our product today create applications from our framework that look nothing like a portal. Typically when people think of portals they think of "My Yahoo!". While many applications developed with netuix look like My Yahoo!, many do not.

A netuix application is represented by one or more XML documents, the most familiar being the .portal file (an XML file with a .portal extension). This portal file may or may not include other portal include files, called pinc files for short (files with the extension .pinc). Just like a JSP can include other JSP files to distribute functionality, a portal file can include other portal files. A pinc file is different from a portal file in that a portal includes the root elements or controls while the pinc file does not. We will discuss this in more detail later. However, for this discussion the portal file is the parent, and it may in turn include one or more pinc files, which in turn may include other pinc files. One other important note: a pinc file must begin with a Book or a Page element as the root element. More on what Books and Pages are in a bit.

In the portal file, you can think of each element representing an instance of a UI control. (UIControls are not to be confused with business controls in Workshop.)These controls are wired in a hierarchical tree. In other words, each control has a parent and zero or more children. The controls can discover each other at runtime and can modify the tree by adding new children or removing existing children. All controls run through a lifecycle (a set of methods called on the control in a particular order). All the methods are called in turn in a depth first order.

Let's walk through the sequence of events that happen when a person requests a portal in single file mode from the browser. But before we do that, we first need to cover a few architectural issues with the portal framework. All requests for a portal or desktop come in through the PortalServlet. The PortalServlet is registered in the web.xml file under the url-patterns **appmanager and *.portal**. If the PortalServlet detects a request ending with ".portal" it knows the request is for a locale file and does not need to go to the persistence API for the XML.

The first thing the PortalServlet must do is parse the XML file (.portal) and generate a control tree from it. Every element in the portal file represents a control in the control tree, and every attribute on the element represents an instance variable on the control. The same hierarchy is maintained in the XML document as in the control tree. A control is simply a Java class that extends another Java class, namely the UIControl class. In this release we don't explicitly expose controls to developers, but developers can interact with the controls using backing files, context, and skeleton JSPs. This is discussed later.

Note: The PortalServlet doesn't actually parse the XML document on each request. A lot of caching and magic is going on behind the scenes to get the desired performance for the enterprise application.

Once the control tree is built and all the instance variables are set on the controls, the control tree is run through its lifecycle. The lifecycle can be thought of as a set of methods on the controls that are called on in a well-defined order. The lifecycle methods are as follows:

```
init()
loadState()
handlePostbackData()
raiseChangeEvents()
preRender()
```

```
saveState()
render()
dispose()
```

These methods are called in depth first order. In other words, all the init() methods are called, followed by the loadState() methods, and so on. They will also be called depth first. Example, given the following control tree, the order in which the init() method would be called is: C1, C2, C5, C3, C6, C7, C4, then the loadState() method would be called in the same order, and so on.
The last method to be called would be C4's dispose() method.

These controls, along with their lifecycles and events, provide a richer programming model over a traditional servlet/JSP-based approach. We still use JSPs and servlets, but controls let you build rich, loosely coupled components that can easily work together.

Portal Controls

This section describes all the netuix controls that make up the portal framework. The control relationship is driven by the XML schema definition `controls-netuix-1_0_0.xsd`. The following figure summarizes the schema definition.

<u>Desktop</u>

The Desktop control is the parent control that hosts all the other netuix controls. Every portal must have one Desktop control. The Desktop control actually provides little functionality above and beyond entitlement checking. The most important use of the Desktop control from a developer perspective is that it has a PresentationContext that can be traversed to get references to all the child controls, like books, pages, and portlets. A DesktopBackingContext was added in 8.1 sp3 along with a richer set of methods for location child controls.

<u>Windows</u>

A Window control provides functionality similar to the windowing concept on your computer. Windows support States and Modes. States affect the rendering of the Window, like minimize, maximize, float, and delete. Modes affect the content, like Edit and Help. (Custom modes are also supported.) Windows can also act as a container for other Windows. For example, a book can contain a page. All Window controls must have a Content control. The Content control is responsible for hosting the actual content inside the window. The Window control is an abstract class that is one of the three derived classes that must be used in the portal. These derived classes are: Books, Pages and Portlets. The figure below shows the relationship between Windows, Books, Pages and Portlets.

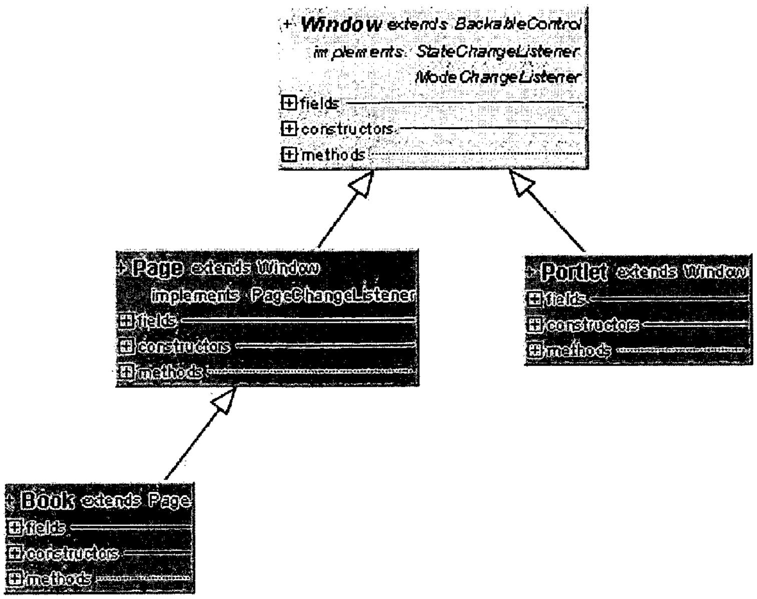

Book

A Book aggregates a set of navigables. A navigable is a Book or a Page. A Book may have an optional menu control that provides navigation among navigables. From a code standpoint, Navigable is an interface that Book and Page implement.

Page

A Page is used to display a set of Placeables. A Placeable is a Portlet or Book. The Page has a layout which has one or more Placeholders which can host zero or more Placeables.

Portlet

Portlets are used as windows to host may different types of applications. As of this writing the applications can be any one of following: HTML pages, JSP files, .pinc files, Page Flows, Webflows, JSR 168 Portlets, and WSRP proxy portlets.

Menus

Menus are optional components that are loosely coupled to books and pages. A menu is responsible for displaying some type of navigation component, whether it is a set of tabs, a set of links, or some tree structure. The menu fires PageChaneEvents that the Pages themselves listen to and activate accordingly.

At the time of this writing, WebLogic Portal provides two types of menus: singlelevel and multilevel. Future service packs and releases may include more. You can also create you own menus by using JSPs and the <render:pageUrl/> tag, or from a backing file call the setupPageChangeEvent method an a Book, Page or Portlet backing context before the preRender method.

SingleLevelMenu

Provides a single row of tabs for the book's immediate pages and child books.

MultiLevelMenu

Recursively provides a hierarchical menu for all the books and pages contained within a book. This menu does not stop at the first set of children. It continues down the tree. If the parent book uses a multilevelmenu, then the child books should not use a menu as the multilevelmenu will cover them.

Layouts

Layouts and Placeholders (not to be confused with personalization placeholders) are used to structure the way portlets and books are displayed on a page. Layout placeholders are rendered as HTML table cells.

WebLogic Portal ships with some predefined layouts and the ability to create your own custom layouts. More layouts will probably be shipped in future service packs and future releases. If the supplied layouts don't meet your needs, you will have to create your own custom layout. The next section describes that process in detail.

Creating a Custom Layout

When creating a custom layout you will need to create three things 1) layout file
2) html.txt file
3) Layout skeleton JSP The layout file contains the snippet of XML that describes the controls that make up the layout. The markup from this file is what gets copied into the .portal file and into the database for reassembly. A layout file must have a ".layout" extension and can live anywhere in the Web application directory except WEB-INF.

Note: Changes made to a layout file after it has been created get picked up automatically in the database but will not automatically update the layout in the .portal files. This is because the .portal file contains a copy of the markup and not a reference to it.

The .html.txt is an HTML snippet strictly used by the WebLogic Administration Portal and Weblogic Workshop to give a visual representation of what the layout looks like, so the administrator can place the portlets in the correct placeholders. Typically this is the last file you will create, because it is not used by the rendering framework.

As of this writing the .layout files must be created by hand (text or XML editor). The best way to get started is by copying an existing layout. Layout files shipped with the portal are located in the `/framework/markup/layout` directory.

The layout files consist of the following elements

`<netuix:markupDefinition/>`

This is the parent element for all markup types and has two child elements, namely:

`<netuix:locale language="nn" [country="nn"] [variant="nnnn"]/>` - Defines the working local for the title and description attributes defined later.

`<netuix:markup>` - Defines the outer envelope stanza that marks the beginning and end of the XML that will define this layout.

The next set of elements are unique to a layout. When creating your own layout you will have to choose from one of these four base layout controls. The <netuix:layout/> is the most generic of the four and all others are derived from it. The <netuix:layout/> control provides the most flexibility but is also the most difficult to implement.

```
<netuix:layout title="" [description=""] type = "" htmlLayoutUri=""
[iconUri=""] markupName="" markupType="Layout" [skeletonUri=""]
[properties=";"]/>
```

This is the base control for all layouts. This control can be used directly or you can use one of the following three derived controls.

| Grid Layout | Flow Layout | Border Layout |
|---|---|---|
| The grid layout automatically positions the number of placeholders you specify into the number of columns and rows you specify. This example sets columns="3" to position 8 placeholders. | The flow layout automatically positions the number of placeholders used either vertically or horizontally with no wrapping. | The border layout lets you use up to five placeholders. You can position the placeholders with the attributes "north," "south," "east," "west," and "center." |

The layout control and all others derived from it have the following attributes:

title – This is the internationalized title displayed to the user and administrators when selecting the layout they want to use.

*Note: the developer only works in one language as defined in the* <netuix:locale> *element described previously. More internationalized versions of the title and description can be added later with the WebLogic Administration Portal.* description – an optional internationalized description of your layout.

type – the type of layout. This is hard coded for the three derived layouts. If you create a custom come up with your own type.

htmlLayoutUri - a fully qualified path (from the top of the Web application) to the html.txt file to be used by the WebLogic Administration.

properties = "name/value pairs that can be passed to the skeleton as hints. These properties can be separated using a semicolon ";".

iconUrl = a fully qualified path (from the top of the Web application) to the .gif file to be used by the WebLogic Administration Portal.

markType – This field is required and must be "Layout".

markupName – This field is required and must be unique per Web application. If you copied the XML from another layout you must change this name.

skeletonUri - A fully qualified path (from the top of the Web application) to the skeleton JSP to be used for runtime rendering.

presentationClass - Optionally provides a generic presentation "class," such as a CSS class, for use by external rendering devices.

presentationStyle - Optionally provides a generic presentation "style," such as a CSS style, for use by external rendering devices.

presentationId - Optionally provides a generic presentation "id" for use by external rendering devices.

<netuix:gridLayout columns="(1-n)" [rows = "1-n"] /> Attributes

This layout defines a grid where you can specify the number of columns and rows. This layout is typically used to create one, two , three, ... column layouts columns – A required attribute that identifies the number of columns in the grid.

rows – An optional attribute specifying the number of rows in the grid. If this attribute is omitted then the default one row will be used.

<netuix:borderLayout [layoutStrategy="order | title" ] /> Attributes

This layout has four border placeholders and one center placeholder. The north and south placeholders span the length of the table. The west, center, and east placeholders comprise the middle row and have respective widths of 25, 50, and 25 percent. The north and south portlets flow horizontally in the placeholders, and the others flow vertically.

layoutStrategy – Defines what placeholder will be the north, west, center, east and south. If "title" is specified then each placeholders must specify the correct title.

<netuix:flowLayout [orientation="vertical | horizontal"]/> Attributes

A layout that just flows the contents in a vertical or horizontal fashion.

orientation – Flow the contents vertical or horizontal

Layout controls contain one or more child placeholder controls. These controls have the following attributes

```
<netuix:placeholder title="" [description=""] [flow="horizontal | vertical"]
[usingFlow=""] [width=""]
markupName="" markupType="Placeholder" [skeletonUri=""]/>
```

title – This is the internationalized title displayed to the user and administrators when selecting the placeholder they want to use.

> Note: the developer only works in one language as defined in the <netuix:locale> element described above. More internationalized versions of the title and description can be added later using the WebLogic Administration Portal.

description – An optional internationalized description of your placeholder.

markType – This field is required and must be “Placeholder”.

markupName – This field is required and must be unique per Web application. If you copied the XML from another layout you must change this name. The naming convention is layoutMarkupName_placeholdersName, but you can use what you want as long as it is unique.

skeletonUri - A fully qualified path (from the top of the Web application) to the skeleton JSP to be used for runtime rendering. Typically the default skeleton will suffice for all custom layouts, but you have the option to create your own.

flow - An optional value specifying the direction of content flow; default is "vertical."

usingFlow - An optional value specifying whether or not flow should be used; default is "true."

width = An optional hint attribute to tell the parent layout how much width this placeholder wishes to have allocated.

properties = Name/value pairs that can be passed to the skeleton as hints. These properties can be separated using a semicolon “;”. Example: `properties="rowspan=2;columnspan=3;myprop=hello"`

Now that we have described the four basic layout controls and child placeholder controls, you will have to choose which one of these to base your custom layout on. Unless you are tweaking one of the parameters in the three sub-class layout controls, you may want to choose the <netuix:layout> control.

The easiest way to describe how to create a custom layout is to give an example. Lets create a custom layout with a spanning row at the top with two columns underneath. The two columns will split the real estate in a 30%-70% fashion.

Our layout will look something like this

```
------------------------------------------
|                                        |
|                Top                     |
------------------------------------------
|          |                             |
|          |                             |
| Bottom   |        Bottom               |
|  Left    |         Right               |
|          |                             |
|          |                             |
------------------------------------------
```

The first thing we need to do is create a layout file (again the easiest way is to copy one from another layout).

We will call our layout file spanningtwocolumn.layout, and it will look something like this

```
<netuix:layout title="Spanning Two Column" description="One row and two columns."
    type="spanning"
    skeletonUri="/customskeletons/spanningtwocolumnlayout.jsp"
    htmlLayoutUri="/framework/markup/layout/spanningtwocolumn.html.txt"
    iconUri="/framework/markup/layout/spanningtwocolumn.gif"
    markupType="Layout" markupName="spanningTwoColumnLayout">
        <netuix:placeholder title="top" description="The top spanning placeholder."
                            markupType="Placeholder"
                            markupName="spanningTwoColumn_top">
        </netuix:placeholder>
        <netuix:placeholder title="left" description="The bottom left placeholder"
                            markupType="Placeholder"
                            markupName="spanningTwoColumn_left">
        </netuix:placeholder>
        <netuix:placeholder title="right" description="The bottom right placeholder"
```

```
                    markupType="Placeholder"
                    markupName="spanningTwoColumn_right">
        </netuix:placeholder>
</netuix:layout>
```

*Note:* *The <netuix:markupDefinition>, <netuix:locale/> and <netuix:markup/> elements are left out of this example for the sake of clarity.*

Note: In the previous layout example we are using the <netuix:layout/> element, and we have three placeholders underneath it. Other things to note are the markupNames are unique, and we have identified our own custom skeleton to do the rendering.

Since a custom skeleton is being used to do the rendering (as specified by the skeletonUri attribute) this JSP needs to be created. Again, the easiest way is to copy an existing one.

> Note: The skeleton JSP for the control is called twice: once during "begin render" and once for "end render." Between the begin render and end render phase the children are rendered. This allows you to start HTML tables in the begin render section and close them in the end render section. All skeleton files should have the following JSP tags `<render:beginRender></render:beginRender>` and `<render:endRender></render:endRender>`. The body of the beginRender tag is only evaluated during the begin render phase, and the body of the endRender tag is only evaluated during the end render phase.

Here is what our new skeleton JSP (`/customskeletons/spanningtwocolumnlayout.jsp`) will look like

```
%@ page import="com.bea.netuix.servlets.util.RenderToolkit,
                com.bea.netuix.servlets.controls.layout.LayoutPresentationContext,
                java.util.List,
                com.bea.netuix.servlets.controls.layout.PlaceholderPresentationContext"
%>
<%@ taglib uri="render.tld" prefix="render" %>
<%
    RenderToolkit toolkit = RenderToolkit.htmlInstance();
    LayoutPresentationContext layout =
        LayoutPresentationContext.getLayoutPresentationContext(request);
%>

<render:beginRender>
    <table
        <% toolkit.writeId(out, layout.getPresentationId()); %>
        <% toolkit.writeAttribute(out, "class", layout.getPresentationClass(), "layout-custom");
%>
        cellspacing="0"
    >
        <tbody>
    <%
        List children = layout.getChildren("layout:placeholder");

        // Could get optional properties here to help with rendering
        // String property = layout.getProperty("myProperty");

        for (int i = 0; i < children.size(); i++)
        {
            PlaceholderPresentationContext placeholderPresentationContext =
                (PlaceholderPresentationContext)children.get(i);
            if (i == 0)
            {
     %>
                <tr>
```

```
            <td colspan="2" width="100%" valign="top" class="layout-placeholder-container">
                <% toolkit.renderChild(placeholderPresentationContext, request); %>
            </td>
            </tr>
    <%
        }
        else if (i == 1)
        {
    %>
            <tr>
            <td width="30%" valign="top" class="layout-placeholder-container">
                <% toolkit.renderChild(placeholderPresentationContext, request); %>
            </td>
    <%
        }
        else if (i == 2)
        {
    %>
            <td width="70%" valign="top" class="layout-placeholder-container">
                <% toolkit.renderChild(placeholderPresentationContext, request); %>
            </td>
            </tr>
    <%
        }
      }
    %>
</render:beginRender>

<render:endRender>
        </tbody>
    </table>
</render:endRender>
```

Note: In the previous example the widths are hard coded in the JSP. Instead, these widths should be specified in the layout file as an attribute to the placeholder. The widths can then be referenced in the skeleton as follows:

```
<render:writeAttribute name="width" value="<%= placeholderPresentationContext != null ?
placeholderpresentationContext.getWidth() : null %>"/>
```

Also, other properties like "rowspan=2" can be passed as name/value pairs on the properties attribute.

The custom layout is now functionally complete. The html.txt file has not yet been created, but the layout can be tested. To do this, start WebLogic Workshop, open or create a portal file, select a page, and in the Property Editor window select the custom layout in the Layout field.

Note: if you change your .layout file after you have used it in the .portal file, changes won't be reflected in the .portal file. This happens because when you use a layout in the .portal it copies the markup from the layout. You will need to chooses another layout and then choose the original one back again to see the changes.

The last this to do is create the html.txt file so the WebLogic Administration Portal can provide a visual representation of the layout. The `/framework/markup/layout/spanningtwocolumn.html.txt` should look something like this

```
<table class="portalLayout" id="thePortalLayout" width="100%" height="100%">
<tbody>
<tr>
        <td class="placeholderTD" valign="top" width="100%" colspan="2">
                <placeholder number="0"></placeholder><br>
        </td>
</tr>
<tr>
        <td class="placeholderTD" valign="top" width="30%">
                <placeholder number="1"></placeholder><br>
        </td>
        <td class="placeholderTD" valign="top" width="70%">
```

```
            <placeholder number="2"></placeholder><br>
        </td>
</tr>
</tbody>
</table>
```

Interacting With Controls

Since controls are not exposed directly to developers, developers need a way to directly interact with and affect the behavior of the controls. To accomplish this, WebLogic Portal exposes context, backing files, skeletons, and events. Developers should use these components when trying to alter the behavior of or interact with the portal framework.

Context

A context is nothing more then a delegate to the underlying control. This delegate only exposes the supported methods on the control.

Contexts are broken down into two types: backing context and presentation context. Backing contexts are available from the backing files, and presentation contexts are available from the JSPs.

Two types of context are required because certain methods apply at certain times in the lifecycle. For example, it doesn't make sense to have a setTitle() method on the Presentation context because the portal has already started to render and it would have no effect. Calling this method from a backing file, however, is appropriate.

Backing Context

BackingContext are available from backing files. A reference to a Backing context can be obtained in one of two ways.

The first way is to use the static method getXXXBackingContext on the context class. This method will return the *active* backing context for that type. To be more specific, if I call this method from portlet A's backing file, I will get the backing context for portlet A not portlet B.
Similarly, if I call getPageBackingContext(request) from portlet A, I will get the page backing context for the page portlet A is located on.

The second way to obtain a backing context is from another context. This can be useful when you want a context that is not the *active* context. Example would be, I want to obtain portlet Bs backing context from portlet A.

If portlet A is contained within the same page as Portlet B then one could use:

PortletBackingContext portletB = PageBackingContext.getPageBackingContext(request).PortletBackingContext getPortletBackingContextRecursive("Portlet Bs instance label");

If Portlet A does not know where portlet B is located then you can delegate to the DesktopBackingContext PortletBackingContext portletB = DesktopBackingContext.getPageBackingContext(request).PortletBackingContext getPortletBackingContextRecursive("Portlet Bs instance label");

Refer to the javadoc on these and other backing context for more information.

com.bea.netuix.servlets.controls.page.PageBackingContext com.bea.netuix.servlets.controls.application.backing.DesktopBackingContext

Presentation Context

PresentationContext are available from JSP files. A reference to a presentation context can be obtained in one of two ways.

The first way is to use the static method getXXXPresentationContext on the context class. This method will return the *active* presentation context for that type. To be more specific, if I call this method from portlet A's content JSP, I will get the presentation context for portlet A not portlet B. Similarly, if I call getPagePresentationContext(request) from portlet A, I will get the page Presentation context for the page portlet A is located on.

The second way to obtain a presentation context is from another context. This can be useful when you want a context that is not the *active* context. Example would be, I want to obtain portlet Bs presentation context from portlet A.

Backing Files

Backing files are simple Java classes that implement the com.bea.netuix.servlets.controls.content.backing.JspBacking interface or extend the com.bea.netuix.servlets.controls.content.backing.AbstractJspBacking abstract class (in retrospect it should have been called a backing class). The methods on the interface mimic the controls lifecycle methods and are invoked at the same time the controls lifecycle methods are invoked.

The controls as of this writing that support backing files are:

Books, Pages, Portlets and JspContent controls. Desktops also support backing files as of sp3

A new instance of a backing file is created per request, so you don't have to worry about thread safety issues. New Java VMs are specially tuned for short-lived objects, and this is not the performance issues it once was in the past. Also JspContent controls support a special type of backing file that allows you to specify if the backing file is thread safe. If this value is set to true, only one instance of the backing file is created and shared across all requests.

Skeletons

Skeletons are JSPs that are used during the render phase. The render phase is actually broken into two parts: begin render and end render. The parent control's begin render is called, followed by its children's begin render, their children's begin render, and so on. After the last begin render is called, the children's end renders are called, ending with the parent's end render. This allows the parent to provide a container, such as an HTML table, and the children to provide the table contents.

Each skeleton is actually called twice. There are special tags in the skeleton that only evaluate to true depending on which render phase you are in.

Events

There are four types of events in the system. Window Mode, Window State, Page Change and Generic Portlet Events. The Mode, State and Page Change Events are not exposed directly to the developer but can be configured through special methods on the Window backing files. Namely: setupModeChangeEvent, setupStateChangeEvent, and setupPageChangeEvent(). The methods must be called before the preRender method as events are fired just after handlePostbackData method. They will also only work if the handlePostbackData method returns true (see javadoc).

Portlet Events (not to be confused with page flow events) allow portlets to communicate.

One portlet can create an event and other portlets can listen for that event. These Portlet events can also carry payloads.

Here is an example of one portlet firing and event from a backing file and other portlets listening for the event,

```
/**
 * This is the implementation on the backing file of the portlet that wants to fire the event.
 */
public boolean handlePostbackData(HttpServletRequest request, HttpServletResponse response)
{
    // Create a new portlet event with the results in the paylod
    PortletEvent portletEvent = new PortletEvent(new MyPayload("Hello From portlet A"));

    // Get a hold of the portlet event manager and fire the event.
    PortletBackingContext portletBackingContext =
        PortletBackingContext.getPortletBackingContext(request);
    PortletEvent.Manager portletEventManager =
        PortletEvent.getEventManager(this, portletBackingContext);
    portletEventManager.fireEvent(portletEvent);

    // Needed for the event to fire.
    return true;
}


/**
 * This is the implementation of the portlet that wants to receive the event.
 */
public class ResultBacking extends AbstractJspBacking implements PortletEventListener
{
    MyPayload result;

    public void init(HttpServletRequest request, HttpServletResponse response)
    {
        result = null;

        // Register for Portlet Events
        PortletBackingContext portletBackingContext =
            PortletBackingContext.getPortletBackingContext(request);
        PortletEvent.addGlobalListener(portletBackingContext, this);
        CustomPortletEvent.Manager portletEventManager =
            CustomPortletEvent.getEventManager(this, portletBackingContext);
    }

    public void handleEvent(Object source, AbstractEvent event)
    {
        // Can check the source of the event
        if (source instanceof PortletA)
        {
            result = (MyPayload)((PortletEvent)event).getPayload();
        }
    }
```

The tutorial portal contains examples of portlets communicating via events.

Customization

Customization is the term used to describe Administrators and End Users making modifications to a desktop. Normally this is done through the Administration tools or the Visitor Tools web application. However, these API can be called directly from within the developer's code. For additional information on these API refer to the javadoc

Appendix netuix-config.xml

The netuix-config.xml file is governed by the XML schema definition file netuix-config.xsd. This file contains settings that can be modified to change the behavior of the portal framework. This file is Web application scoped, and the Web application must be redeployed to pick up changes to the file. The file contains the following elements and attributes:

customization - Enable (default) or disable customization. The portal has two modes of operation. In one mode, users and administrators are allowed to customize the portal using a browser (add/delete portlets, pages, books, etc.). In this mode the portal EJBs and a database must be deployed. In the second mode (the browser hitting the .portal file directly) no customization is allowed, so no database or portal EJBs are required. This flag is an indicator to the system what mode of operation the portal is in. To run "light portal" this element must be set to false. To pick up portlets, layouts, shells, look and feels, and themes in the database, this element must be set to true.

pageflow - Enable (default) or disable Page Flow components. In order to run Page Flow portlets in the portal, this element must be enabled. If you are not running Page Flow applications you can set this element to false and pick up some performance improvements especially during iterative development.

entitlements - Turn entitlement checking off at runtime. The value of the resource-cache-size attribute is a size for the control resources cache. This size depends on the number of desktops, portlets, pages, placeholders, and books contained in a portal. The size can be determined by enabling debug for com.bea.netuix.servlets.entitlements.ControlResource in the debug.properties file located in the domain directory. Debug prints out the size for a portal when clicked on all the pages of a portal. The size to be used is from the last line that is printed on the console after clicking on all the pages (all top-level and inner pages).

localization - Enable (default) or disable localization. When localization is enabled, the portal framework attempts to deliver localized content based on a directory search. Set the enable element to "true" to enable localization. Disable localization by setting this element to "false". For performance reasons, if the portal Web application is prepared to deliver localized content, disable localization. To specify a locale provider, include the locale-provider element with value set to the class of the desired LocaleProvider implementation.

default-locale – Default local used thought the system.

propagate-preferences-on-deploy - The propagate-preferences-on-deploy element specifies if portlet preferences should be propagated to the underlying preference store or not. If this element is present, portlet preferences will be propagated to the underlying preference store. If the attribute propagate-to-instances is true, portlet preferences will also be propagated to instances created out of portlets.

reload-database-on-redeploy - Because of the way iterative development redeploys the Web application on any changes to a control or Page Flow, this will stop the database from being reloaded if you are in development mode (i.e. !AppDescriptor.isProductionModeEnabled). This defaults to 'false'. If you are in development mode and you want the database to be reloaded from the Web application on a redeploy, set to 'true'.

window-state - The window-state element describes properties of container-supported window states. This element has child elements for each of the different states. You can specify image names and localized alternate text.

window-mode - The window-mode element describes properties of container-supported window modes. This element has child elements for each of the supplied modes, and you can define your own modes.

```
<!-- Example of a custom mode in two languages -->
<window-mode name="SourceViewToggleButton">
    <activate-image>titlebar-button-source.gif</activate-image>
    <deactivate-image>titlebar-button-source-exit.gif</deactivate-image>
    <alt-text>
        <locale language="en">
            <activate>Source View</activate>
            <deactivate>Leave Source View</deactivate>
        </locale>
        <locale language="es">
            <activate>la vista de la fuente</activate>
            <deactivate>Salga la fuente la vista</deactivate>
        </locale>
```

```
    </alt-text>
</window-mode>
```

To use the above custom mode in a portlet or book you can do the following:

```
<netuix:titlebar>
    <netuix:modeToggleButton name="SourceViewToggleButton"
                             contentUri="/source.jsp" />
    <netuix:minimize/>
</netuix:titlebar>
```

validation – Determines whether XML schema validation is performed on the different XML documents that WebLogic Portal parses.

include-files – Enable (default) or disable validation of '.pinc' files.

dot-files - Enable (default) or disable validation of '.' files (portlet, theme, layout, laf). Turing this off can speed up WebLogic Portal start times and redeployment times. However, turning validation off and allowing invalid files causes error.

control-state-location - The control-state-location element specifies the location for storing control state. All the state for the portal framework can be configured to be stored in different ways; each having advantages and disadvantages. The state includes: current page, active pages, window state (minimize, maximized, etc.). Control state is is not the same as application state. Application state is up to each developer.

> session - Stores the control state in the user's HTTP session. This is the default control state location. The control state can be preserved until the end of the session.
>
> url - Encodes the control state in portal framework generated links. The control state can be preserved forever. However, clients (browsers) may have limits on the maximum number of characters. When the control state length exceeds the specified maximum number of characters, the portal framework automatically switches the state location to HTTP session.
>
> cookie - Stores the control state as cookies. The expires attributes may be used to specify the lifetime (in seconds) of cookies user for storing control state.

desktop-not-entitled-error-code - The desktop-not-entitled-code element defines the error code to return for access to a desktop denied by an entitlement. The valid options for code are:

> 401 - Unauthorized
> 403 - Forbidden (default)
> 404 - Not found - use if you don't want to let the user know the resource exists.

Performance

Running Weblogic Portal Server in Production SETUP

- To start portal server, use this command "`startWebLogic.cmd/startWebLogic.sh nodebug production notestconsole noiterativedev noLogErrorsToConsole nopointbase`".
- In workshopLogCfg.xml and workshopLogCfgVerbose.xml files change priority value to "warn" for all the categories. These files contain configuration information for logging by log4j framework. These files can be found under <install-dir>/bea/weblogic812/common/lib.

- Deploy all the portal web-applications with servletReloadCheckSecs set to "-1" in config.xml.

Configuration in netuix-config.xml

The "netuix-config.xml" contains portal framework related configuration information. It is web-application scoped.

- The "customization" element is a switch to indicate if a portal is customizable or not. If a portal is served from a ".portal" file (rather than from a database) and users are not allowed to customize it then customization could be disabled by setting "enable" element's value to "false". If a portal supports customizations then customization should be enabled.
- The "pageflow" element is a switch to enable or disable pageflows usage in a portal, disable it if a portal is not using any pageflows.
- The "validation" element is a switch for validating portal related files such as ". pinc", ".portlet", and ".portal" files. Disable validation when running portal server in production setup.
- The "entitlements" element is a switch to indicate that a portal is setup to use entitlement policies (users to portal resources such as desktop, books, pages, portlets, etc). Disable entitlements if a portal is not using any security policies. If a portal is using security policies enable it and set the value for "control-resource-cache-size" attribute using "control-resource-cache-size" = num of desktops + num of books + num of pages + num of portlets + num of buttons (max, min, help, edit) used in a portal. The default value could be used if memory is a concern.
- The "localization" element is a switch to indicate that a portal supports multiple locales. This could be disabled if a portal supports only one locale.

Cache Configuration

The "application-config.xml" file contains settings for all the caches, it can be found under <enterprise-application-dir>/META-INF/. For a database based (streaming) portal, the max entries for "portalControlTreeCache" cache should be set to a value based on num of users, available memory and portal size. An ideal value is equal to number of users plus one. If a portal has floatable portlets the above rule should be applied in finding an optimal value for max entries for "portletControlTreeCache" cache.

Note: Don't change "TimeToLive"; it is set to "-1" by default.

Static Files

The look and feel of a portal uses "css", "js" and gif files. The performance and scalability will improve if these static files are served from a different web server.

Portal Size

The performance and scalability of a portal application also depends on a portal size, number of books, number of pages, number of portlets and number of buttons. The time taken to serve a portal from file or database depends on portal's size as it involves XML parsing.

A portal served from database is cached (portalControlTreeCache) to avoid going to the portal database from second time onwards. The portal is cached for each user, if users have customized their portals. The memory usage goes up as the number of users with customizations increase. Download portal_stats.jar tool to find out memory and response statistics for a portal.

Note: The memory size calculated is not accurate.

Portlet Content

The portlet's content is referenced by contentUri element in ".portlet" file, if it is expensive to compute content every time, consider using renderCacheable portlet attributes to cache portlet's content or if the portlet's content type is jsp, consider using wl:cache jsp tags to cache static portions within a jsp.

JVM parameter values

The following JVM parameters shown in Table 1.0 proved to be the best for the hardware configurations listed in Table 2.0.

| JVM | W2K | Linux | Solaris |
|---|---|---|---|
| BEA jrockit81sp2_141_05 | -Xms1024<br>-Xmx1024<br>-Xgc:parallel | -Xms1024<br>-Xmx1024<br>-Xgc:parallel | -Xms1024<br>-Xmx1024<br>-Xgc:parallel |
| JDK 1.4.1_05 server VM | -Xms1024<br>-Xmx1024<br>-XX:NewRatio=2<br>-XX:MaxPermSize=128m | -Xms1024<br>-Xmx1024<br>-XX:NewRatio=2<br>-XX:+UseParallelGC<br>-XX:MaxPermSize=128m | -Xms1024<br>-Xmx1024<br>-XX:NewRatio=2<br>-XX:+UseParallelGC<br>-XX:MaxPermSize=128m |

Table 1.0: High Performing JVM parameters

| Platform Name | CPUs * CPU speed | CPU type | Physical Memory | CPU bits | Hardware Model | OS |
|---|---|---|---|---|---|---|
| W2K | 1 * 3.0GHz | Intel Pentium® 4 | 2048MB | 32 | Dell 650 | Microsoft Windows 2000, Advanced Server |
| Linux | 1 * 3.0GHz | Intel Pentium® 4 | 2048MB | 32 | Dell 650 | Red Hat Linux Advanced Server release 2.1AS/i686 (Pensacola) |
| Solaris | 2 * 1002MHz | Sun's sparcv9 processor | 2048MB | 64 | Sun 240V | SunOS 5.9 |

Table 2.0: Hardware used in WLP8.1 sp2 load testing

What is claimed is:

1. A system including a portal including:

means for constructing a portal using a portal element control with lifecycle methods, the portal element control being associated with a backing file; and means for using backing file code of the backing file in at least one lifecycle method of the portal element control before the rendering of the portal element;

wherein the portal has a number of portal controls including a page control, a desktop control and a portlet control and wherein at least some of the portal controls have an associated backing file that contains code provided by developers to be run for an associated portal control;

and wherein the system including at least one processor to run the portal.

2. The system of claim 1, wherein multiple portal element controls have backing files.

3. The system of claim 1, wherein a new instance of the backing file is created for each request.

4. The system of claim 1, wherein a backing context allows access to methods to affect state information of the portal element control before the rendering of the portal element.

5. The system of claim 4, wherein the backing file uses the backing context.

6. The system of claim 4, wherein the backing context allows access to get methods.

7. The system of claim 4, wherein the backing context allows access to set methods.

8. The system of claim 1, wherein the backing file includes business logic.

9. The system of claim 1, wherein backing file modifies the portal element display.

10. The system of claim 1, wherein a portal element skeleton JSP is used by the portal element control during the rendering of the portal element.

11. A computer implemented method comprising:

constructing a portal using a portal element control with lifecycle methods, the portal element control being associated with a backing file; and using backing file code of the backing file in at least one lifecycle method of the portal element control before the rendering of the portal element;

wherein the portal has a number of portal controls including a page control, a desktop control and a port let control and wherein at least some of the portal controls have an associated backing file that contains code provided by developers to be run for an associated portal control.

12. The computer implemented method of claim 11, wherein multiple portal element controls have backing files.

13. The computer implemented method of claim 11, wherein a new instance of the backing file is created for each request.

14. The computer implemented method of claim 11, wherein a backing context allows access to methods to affect state information of the portal element control before the rendering of the portal element.

15. The computer implemented method of claim 14, wherein the backing file uses the backing context.

16. The computer implemented method of claim 14, wherein the backing context allows access to get methods.

17. The computer implemented method of claim 14, wherein the backing context allows access to set methods.

18. The computer implemented method of claim 11, wherein the backing file includes business logic.

19. A machine storage medium having instructions stored thereon that when executed by a processor cause a system to:

construct a portal using a portal element control with lifecycle methods, the portal element control being associated with a backing file; and use backing file code of the backing file in at least one lifecycle method of the portal element control before the rendering of the portal element;

wherein the portal has a number of portal controls including a page control, a desktop control and a portlet control and wherein at least some of the portal controls have an associated backing file that contains code provided by developers to be run for an associated portal control.

20. The machine readable medium of claim 19, wherein multiple portal element controls have backing files.

* * * * *

UNITED STATES PATENT AND TRADEMARK OFFICE

CERTIFICATE OF CORRECTION

PATENT NO. : 7,614,039 B2
APPLICATION NO. : 11/131578
DATED : November 3, 2009
INVENTOR(S) : Chris Jolley et al.

It is certified that error appears in the above-identified patent and that said Letters Patent is hereby corrected as shown below:

In column 11-12, line 15, delete “PageChaneEvents” and insert -- PageChangeEvents --, therefor.

Signed and Sealed this

Third Day of August, 2010

David J. Kappos
*Director of the United States Patent and Trademark Office*

UNITED STATES PATENT AND TRADEMARK OFFICE

CERTIFICATE OF CORRECTION

PATENT NO. : 7,614,039 B2
APPLICATION NO. : 11/131578
DATED : November 3, 2009
INVENTOR(S) : Chris Jolley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Nineteenth Day of October, 2010

David J. Kappos

David J. Kappos
*Director of the United States Patent and Trademark Office*